(12) United States Patent
Bai et al.

(10) Patent No.: US 10,803,306 B2
(45) Date of Patent: Oct. 13, 2020

(54) ELECTRONIC DEVICE WITH IMAGE CAPTURING MODULE AND RELEASING METHOD OF IMAGE CAPTURING MODULE THEREOF

(71) Applicants: Yun Bai, Taipei (TW); Chang-Kai Liu, Taipei (TW); Chang-Chieh Yang, Taipei (TW); Guan-Chen Chen, Taipei (TW); Chiao-Min Tsai, Taipei (TW); Chia-Sheng Liu, Taipei (TW)

(72) Inventors: Yun Bai, Taipei (TW); Chang-Kai Liu, Taipei (TW); Chang-Chieh Yang, Taipei (TW); Guan-Chen Chen, Taipei (TW); Chiao-Min Tsai, Taipei (TW); Chia-Sheng Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 219 days.

(21) Appl. No.: 15/987,909

(22) Filed: May 24, 2018

(65) Prior Publication Data

US 2019/0005319 A1 Jan. 3, 2019

Related U.S. Application Data

(60) Provisional application No. 62/510,738, filed on May 24, 2017.

(51) Int. Cl.
*F16M 13/00* (2006.01)
*F16M 11/38* (2006.01)
(Continued)

(52) U.S. Cl.
CPC ......... *G06K 9/00369* (2013.01); *F16M 11/10* (2013.01); *F16M 11/38* (2013.01);
(Continued)

(58) Field of Classification Search
None
See application file for complete search history.

(56) References Cited

U.S. PATENT DOCUMENTS

2018/0292866 A1* 10/2018 Tucker .................. G06F 1/1686

FOREIGN PATENT DOCUMENTS

| CN | 106657471 | 5/2017 |
|----|-----------|--------|
| TW | I349178 | 9/2011 |
| TW | M541596 | 5/2017 |

OTHER PUBLICATIONS

"Office Action of Taiwan Counterpart Application," dated Feb. 25, 2019, pp. 1-8.

* cited by examiner

*Primary Examiner* — Idowu O Osifade
(74) *Attorney, Agent, or Firm* — JCIPRNET

(57) ABSTRACT

A releasing method of an image capturing module of an electronic device, including an electronic device, wherein the electronic device includes a first machine body and an image capturing module pivotally connected to the first machine body, and the image capturing module is restrained by the first machine body to approach to the first machine body. Performing a posture estimation procedure includes, sensing a first included angle between the first machine body and a gravity direction for determining whether the electronic device is in a tent position. When the electronic device is determined to be in the tent position, determine whether a release instruction is received, so as to decide whether to perform a release procedure, wherein when the release procedure is performed, the first machine body releases the image capturing module, so that the image capturing module is turned up relative to the first machine body.

31 Claims, 11 Drawing Sheets

(51) Int. Cl.
  *F16M 11/10*    (2006.01)
  *G03B 17/02*    (2006.01)
  *H04N 5/232*    (2006.01)
  *G06K 9/00*     (2006.01)
  *G06F 1/16*     (2006.01)
  *G06F 3/041*    (2006.01)

(52) U.S. Cl.
  CPC ........... *F16M 13/005* (2013.01); *G03B 17/02* (2013.01); *G06F 1/166* (2013.01); *G06F 1/1607* (2013.01); *G06F 1/1626* (2013.01); *G06F 1/1632* (2013.01); *G06F 3/0416* (2013.01); *H04N 5/23216* (2013.01); *G06F 2200/1633* (2013.01)

ELECTRONIC DEVICE WITH IMAGE CAPTURING MODULE AND RELEASING METHOD OF IMAGE CAPTURING MODULE THEREOF

CROSS-REFERENCE TO RELATED APPLICATION

This application claims the priority benefit of U.S. provisional application Ser. No. 62/510,738, filed on May 24, 2017. The entirety of the above-mentioned patent application is hereby incorporated by reference herein and made a part of this specification.

BACKGROUND OF THE DISCLOSURE

1. Field of the Disclosure

The disclosure relates to an electronic device and a releasing method of an image capturing module thereof, in particular, to an electronic device with an image capturing module and a releasing method of the image capturing module thereof.

2. Description of Related Art

Along with advancement of technology, functions of electronic devices have become more diverse. For example, in addition to being configured for common word processing, notebook computers can also provide a video function since quite a number of notebook computers are equipped with lenses. A user may see an image of the opposite side via a screen of the notebook computer, and an image of the user may also be captured by the camera lens and transmitted to the opposite side via the notebook computer. However, if many people want to use the video chat together, since the position of the camera lens is fixed, these people can be only seen by the opposite side by huddling in front of the camera lens, which is very inconvenient.

SUMMARY OF THE DISCLOSURE

The disclosure provides a releasing method of an image capturing module of an electronic device, wherein a first machine body may release the image capturing module, so that the image capturing module is turned up relative to the first machine body.

The disclosure provides an electronic device, and an image capturing module thereof is adapted for turning up relative to a first machine body.

A releasing method of an image capturing module of an electronic device of the disclosure includes: providing a first electronic device, wherein the electronic device includes a first machine body and an image capturing module pivotally connected to the first machine body, and the image capturing module is restrained by the first machine body to approach to the first machine body; executing a posture estimation procedure, including: sensing a first included angle between the first machine body and a gravity direction for determining whether the electronic device is in a first tent position; and determining whether a release instruction is received when the electronic device is determined to be in the tent position, so as to decide whether to perform a release procedure, wherein when the release procedure is performed, the first machine body releases the image capturing module, so that the image capturing module is turned up relative to the first machine body.

In an embodiment of the disclosure, when the first included angle is within a first preset range, the electronic device is determined to be in a tent position.

In an embodiment of the disclosure, the foregoing first preset range is between 10 degrees and 60 degrees.

In an embodiment of the disclosure, the foregoing electronic device further includes a second machine body pivotally connected to the first machine body, and the posture estimation procedure further includes: sensing a second included angle between the second machine body and the gravity direction, and determining whether the second included angle is within a second preset range, wherein when the first included angle is within the first preset range, and the second included angle is within the second preset range, the electronic device is determined to be in the tent position.

In an embodiment of the disclosure, the foregoing second preset range is between 10 degrees and 60 degrees.

In an embodiment of the disclosure, the foregoing first machine body includes a first magnetic member movably disposed therein, the image capturing module includes a second magnetic member, the first magnetic member is adapted for magnetically attracting the second magnetic member, so that the image capturing module approaches to the first machine body, and when the release procedure is performed, the first magnetic member is moved, so that the first magnetic member does not magnetically attract the second magnetic member of the image capturing module.

In an embodiment of the disclosure, the foregoing first machine body also includes a heat source and a memory material member, the memory material member is thermally coupled to the heat source and is connected to the first magnetic member, and when the release procedure is performed, the memory material member is heated by the heat source to deform, and the first magnetic member is linked to the memory material member to keep away from the second magnetic member.

In an embodiment of the disclosure, after the release procedure is performed, the temperature of the memory material member is cooled, and the memory material member restores to its original shape, so as to cause the first magnetic member to return to the original position. In an embodiment of the disclosure, when the electronic device is in the tent position, a first turn-up angle is formed between the image capturing module and the first machine body, a second turn-up angle is formed between the first machine body and the second machine body, and the second turn-up angle is equal to two times of the first turn-up angle.

A releasing method of an image capturing module of an electronic device of the disclosure includes: providing an electronic device, wherein the electronic device includes a first machine body, a first magnetic member movably located in the first machine body and an image capturing module pivotally connected to the first machine body, the image capturing module includes a second magnetic member, and the first magnetic member is adapted for magnetically attracting the second magnetic member, so that the image capturing module approaches to the first machine body; and determining whether a release instruction is received, so as to perform a release procedure, wherein when the release procedure is performed, the first magnetic member is moved, and the first magnetic member does not magnetically attract the second magnetic member of the image capturing module, so that the image capturing module is adapted to be turned up relative to the first machine body.

In an embodiment of the disclosure, the foregoing release instruction is a touch control instruction or a button instruction.

In an embodiment of the disclosure, the foregoing first machine body includes an indicator light, and when the release procedure is performed, the indicator light shines or flickers for a preset time.

In an embodiment of the disclosure, the foregoing first machine body includes a control switch, and after the release procedure is performed, the image capturing module triggers the control switch, so as to activate the image capturing module.

In an embodiment of the disclosure, after the release procedure is performed, the image capturing module triggers the control switch, so as to turn off the indicator light.

In an embodiment of the disclosure, the foregoing electronic device further includes a second machine body, being pivotally connected to the first machine body, and the second machine body includes a display module.

In an embodiment of the disclosure, when the release procedure is performed, the display module displays a prompt screen of an image capturing module or a user operation interface of an image capturing module.

An electronic device of the disclosure includes a first machine body and an image capturing module. The first machine body includes a first magnetic member movably disposed therein. The image capturing module is pivotally connected to the first machine body, and includes a second magnetic member, wherein when the first magnetic member is located at a first position, the first magnetic member magnetically attracts the second magnetic member of the image capturing module, so that the image capturing module approaches to the first machine body; and when the first magnetic member moves to a second position, the first magnetic member does not magnetically attract the second magnetic member of the image capturing module, so that the image capturing module is adapted to be turned up relative to the first machine body.

In an embodiment of the disclosure, the foregoing first machine body also includes a heat source and a memory material member. The memory material member is thermally coupled to the heat source and is connected to the first magnetic member, the memory material member is adapted to be heated by the heat source to deform, and the first magnetic member is linked to the memory material member so as to move from a first position to a second position.

In an embodiment of the disclosure, the foregoing first machine body further includes a processor and a trigger switch. The processor is electrically connected to the heat source. The trigger switch is electrically connected to the processor, and when the trigger switch is triggered, the processor instructs the heat source to emit heat.

In an embodiment of the disclosure, the foregoing first machine body still further includes a first gravity sensor, which is electrically connected to the processor.

In an embodiment of the disclosure, the foregoing first machine body yet further includes a shifting rod, which is linked to the first magnetic member and exposed out of the first machine body, and when the shifting rod is moved, the first magnetic member is linked to the shifting rod so as to move from a first position to a second position.

In an embodiment of the disclosure, the foregoing first machine body includes a keyboard module, the image capturing module is pivotally connected to a first side of the first machine body, the keyboard module includes multiple rows of keys, and when the image capturing module approaches to the first machine body, the image capturing module is located between the first side and one row of keys which are closest to the first side.

In an embodiment of the disclosure, the foregoing first machine body includes a keyboard module, the image capturing module is pivotally connected to a first side of the first machine body, the keyboard module includes multiple rows of keys, and when the image capturing module approaches to the first machine body, the image capturing module extends into at least one row of some rows of keys closest to the first side.

In an embodiment of the disclosure, the foregoing electronic device further includes a second machine body, which is pivotally connected to the first machine body.

In an embodiment of the disclosure, the foregoing second machine body includes a second gravity sensor, which is electrically connected to the processor.

In an embodiment of the disclosure, the foregoing first machine body further includes a cavity, which is configured to contain the image capturing module.

In an embodiment of the disclosure, the foregoing image capturing module comprises a first lens and a second lens.

In an embodiment of the disclosure, when the first magnetic member moves to the second position, an optical axis direction of the first lens and an optical axis direction of the second lens are respectively parallel to a horizontal reference plane.

In an embodiment of the disclosure, the foregoing first machine body further includes a torsional spring and a rotating shaft, wherein one end of the rotating shaft is fixed in the first machine body, the other end is fixed in the image capturing module, the torsional spring winds the rotating shaft, one end of the torsional spring is fixed in the first machine body, the other end is fixed in the image capturing module, and when the first magnetic member moves to the second position, the image capturing module is turned up relative to the first machine body due to the action of the torsional spring.

In an embodiment of the disclosure, the foregoing first magnetic member contains multiple first magnets, and the second magnetic member contains multiple second magnets.

In an embodiment of the disclosure, when the first magnetic member moves to the second position, the first magnets and the second magnets repel each other, and the image capturing module is turned up relative to the first machine body due to the effect of repelling.

Based on the forgoing, in a releasing method of an image capturing module of an electronic device in an embodiment of the disclosure, whether the electronic device is in a tent position may be determined based on a posture estimation procedure, and when the electronic device is determined to be in the tent position and receives a release instruction, the first machine body releases the image capturing module, so that the image capturing module is turned up relative to the first machine body. In a releasing method of an image capturing module of an electronic device in an embodiment of the disclosure, the first machine body may also release the image capturing module by directly determining whether a release instruction is received. In the electronic device disclosed by the disclosure, when the first magnetic member of the first machine body is located at a first position, the first magnetic member magnetically attracts the second magnetic member of the image capturing module, so that the image capturing module approaches to the first machine body. When the first magnetic member moves to a second position, the first magnetic member does not magnetically attract the second magnetic member of the image capturing module, so that the image capturing module is adapted to be turned up relative to the first machine body.

In order to make the aforementioned and other objectives and advantages of the disclosure more comprehensible, embodiments accompanied with figures are described in detail below.

DESCRIPTION OF THE EMBODIMENTS

Figure 1:
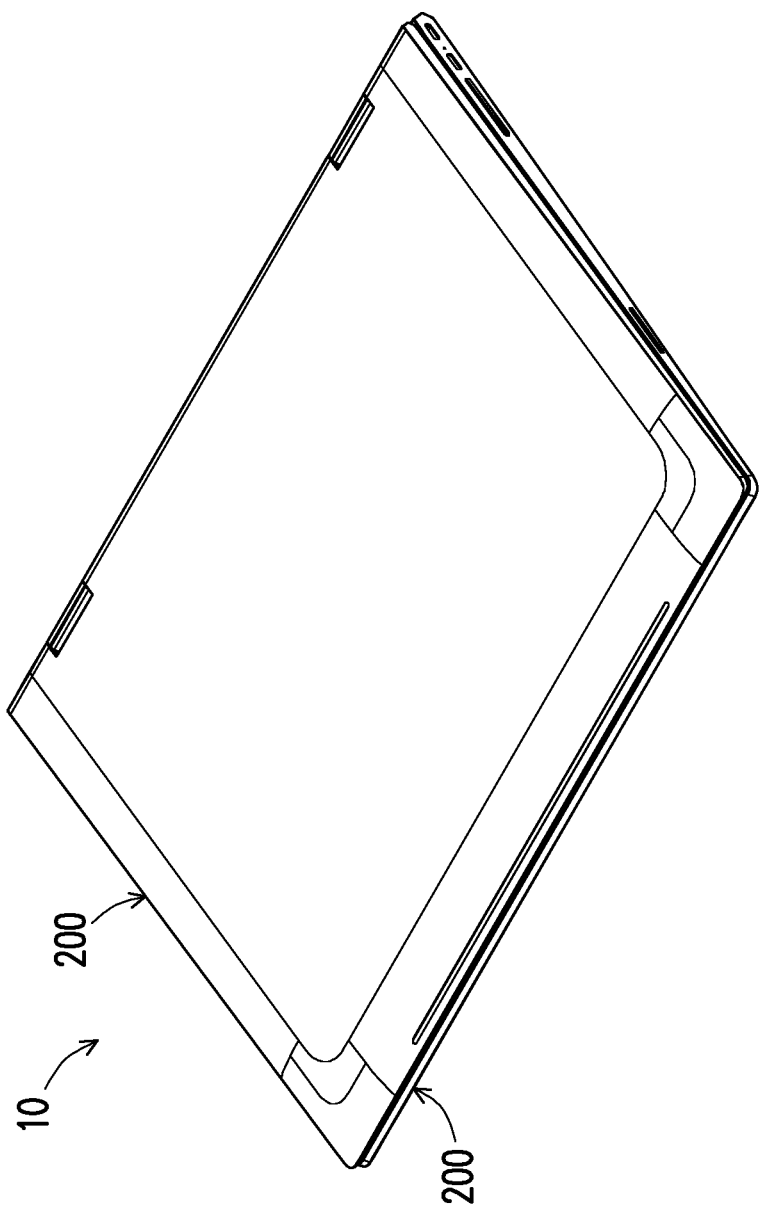
FIG. 1 is a schematic diagram of an electronic device according to an embodiment of the disclosure.
Figure 2:
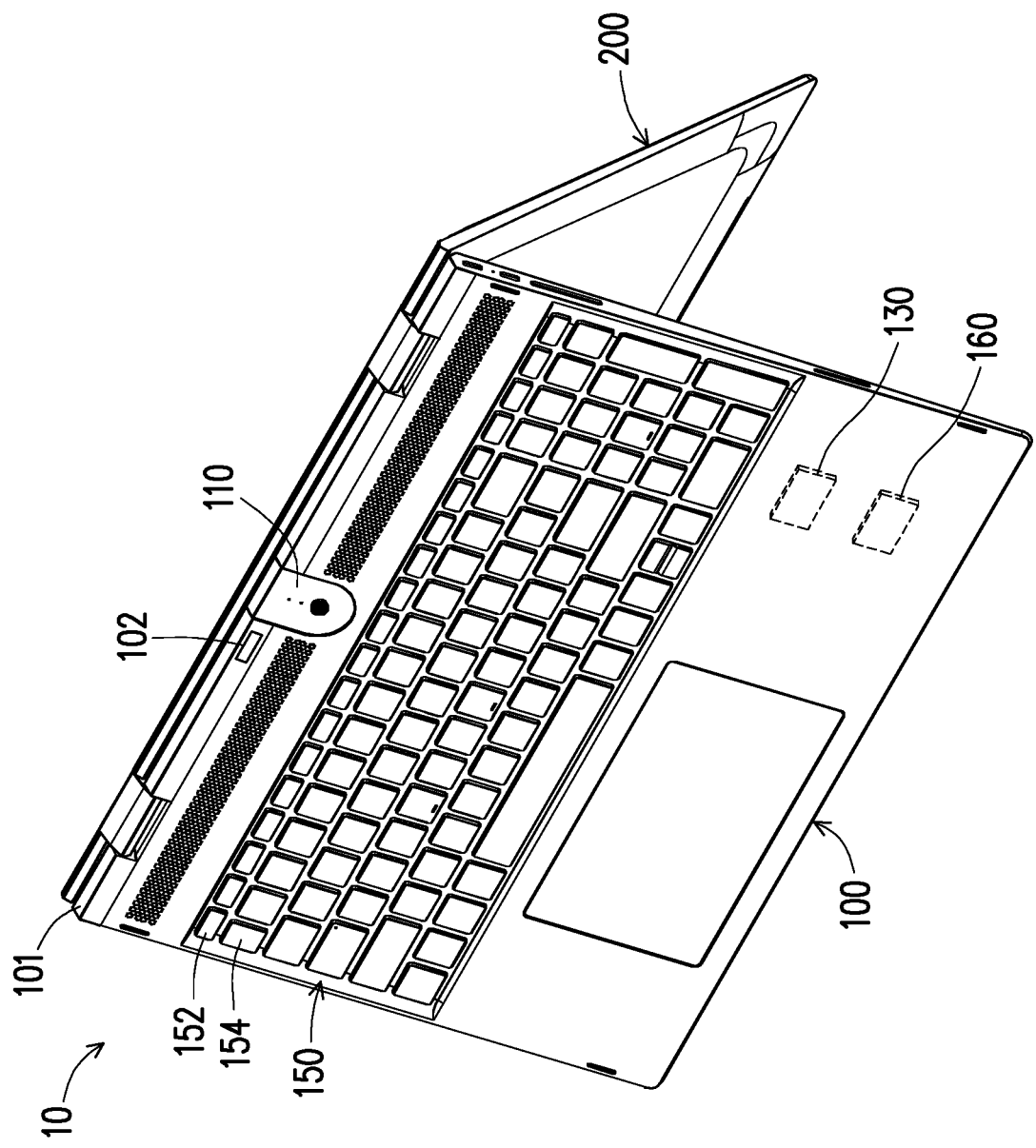
FIG. 2 is a schematic diagram when the electronic device of FIG. 1 is in a tent position.
Figure 3:
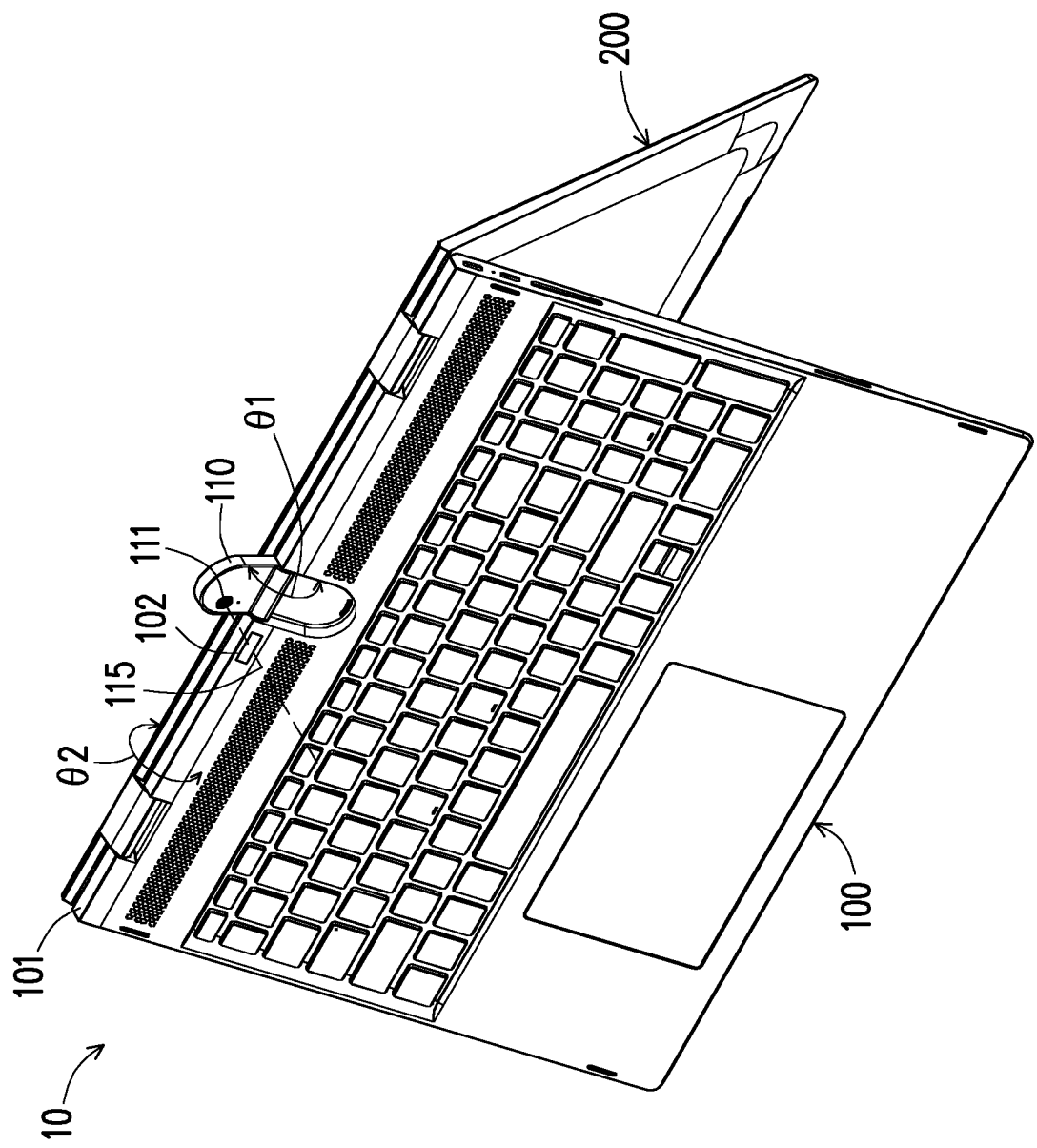
FIG. 3 is a schematic diagram when an image capturing module of the electronic device of FIG. 1 is turned up.
Figure 4:
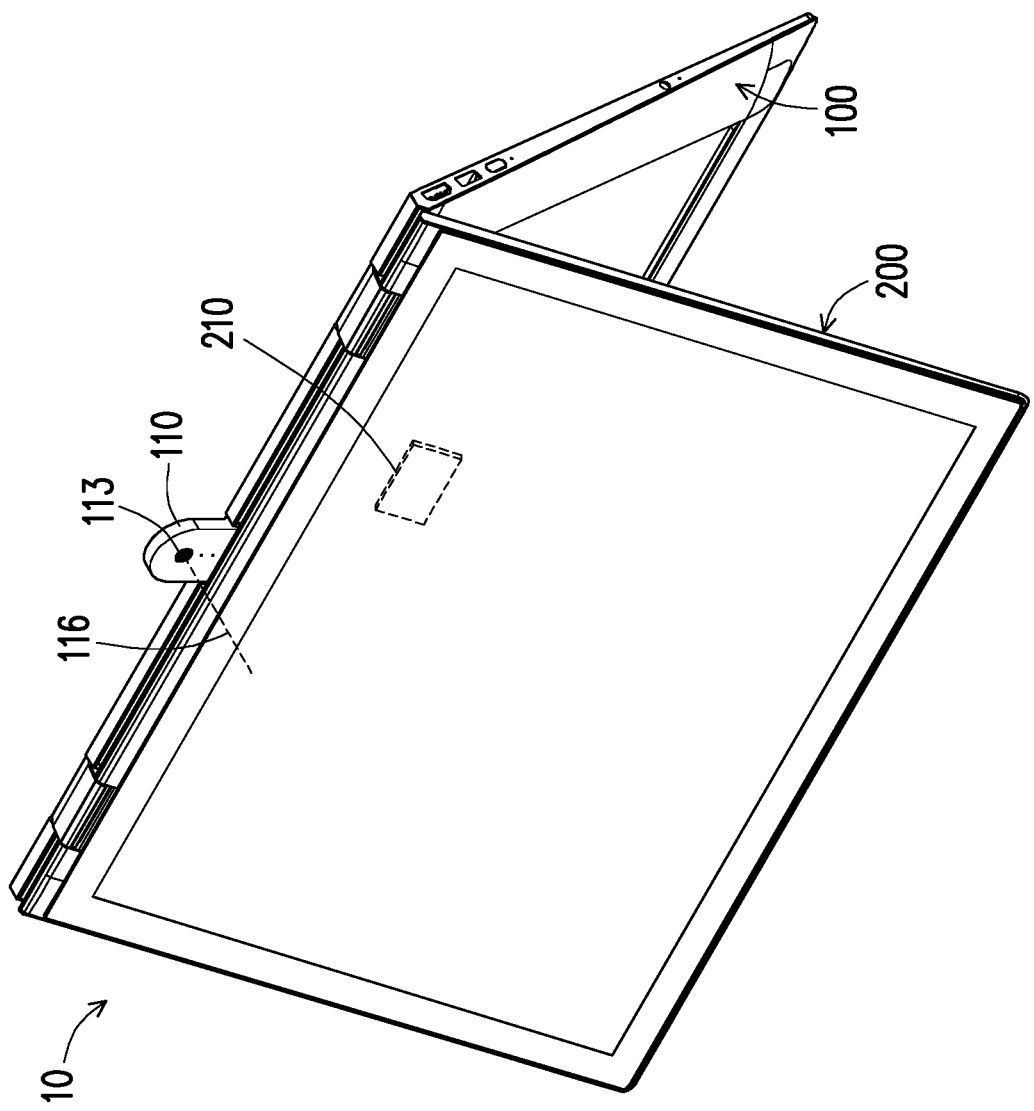
FIG. 4 is a schematic diagram of FIG. 3 from another viewing angle.

FIG. 1 is a schematic diagram of an electronic device according to an embodiment of the disclosure. FIG. 2 is a schematic diagram when the electronic device of FIG. 1 is in a tent position. FIG. 3 is a schematic diagram when the image capturing module of the electronic device of FIG. 1 is turned up. FIG. 4 is a schematic diagram of FIG. 3 from another viewing angle.

Referring to FIG. 1-FIG. 4, a notebook computer is taken as an example of an electronic device 10 of the embodiment, but the variety of the electronic device 10 is not limited to this, and in other embodiments, the electronic device 10 may also be a tablet computer or devices of other types. The electronic device 10 includes a first machine body 100 and an image capturing module 110 pivotally connected to the first machine body 100. The first machine body 100 is, for example, a lower machine body of the notebook computer. In the embodiment, the electronic device 10 further includes a second machine body 200 pivotally connected to the first machine body 100. The second machine body 200 is, for example, an upper machine body of the notebook computer. The image capturing module 110 is located between the first machine body 100 and the second machine body 200.

It can be seen from FIG. 2 and FIG. 3 that, the second machine body 200 may be turned over relative to the first machine body 100 to form a tent position so as to stand up on a tabletop. It can be seen from FIG. 3 and FIG. 4 that, when the electronic device 10 is in the tent position, the image capturing module 110 can be turned up relative to the first machine body 100 so as to be located above the first machine body 100 and the second machine body 200. In the embodiment, the image capturing module 110, for example, includes double lens or a 360 degrees lens located on a front side and a back side. Therefore, when the electronic device 10 of the embodiment is used for a video conference, images of participants at the front side and the back side of the electronic device 10 may be captured by the image capturing module 110, which is very convenient for an opposite side to see the images of these participants at different positions. In one embodiment, the image capturing module 110 comprises a first lens 111 and a second lens 113. In one embodiment, the first lens and the second lens are respectively a first fish-eye lens and a second fish-eye lens. Of course, the variety of the image capturing module 110 is not limited to this.

In addition, in the embodiment, as shown in FIG. 3, when the electronic device 10 is in the tent position, a first turn-up angle θ3 is formed between the image capturing module 110 and the first machine body 100, a second turn-up angle θ4 is formed between the first machine body 100 and the second machine body 200, and the second turn-up angle θ4 is equal to two times of the first turn-up angle θ3. That is, an included angle between the image capturing module 110 and the first machine body 100 is equal to an included angle between the image capturing module 110 and the second machine body 200. In one embodiment, the first turn-up angle θ3, for example, is between 100 degrees and 150 degrees, but the scope of the first turn-up angle θ3 is not limited to this. Of course, in other embodiments, a relationship between the second turn-up angle θ4 and the first turn-up angle θ3 is not limited to this.

It can be seen from FIG. 2 that, in the embodiment, the first machine body 100 further includes a processor 130 and a trigger switch 102 electrically connected to the processor 130. The trigger switch 102, for example, is a touchpad or a physical button. In the embodiment, when a user needs to turn up the image capturing module 110, the user may touch the trigger switch 102 on the first machine body 100, so as to turn up the image capturing module 110. In addition, the electronic device 10 may also be designed in a manner that the trigger switch 102 is pressed for a long time or is pressed for a short time for two times, so that the processor 130 receives a message of needing to turn up the image capturing module 110. Of course, manners for the processor 130 to determine whether to turn up the image capturing module 110 are not limited to this. A mechanism for turning up the image capturing module 110 will be described below.

Figure 5:
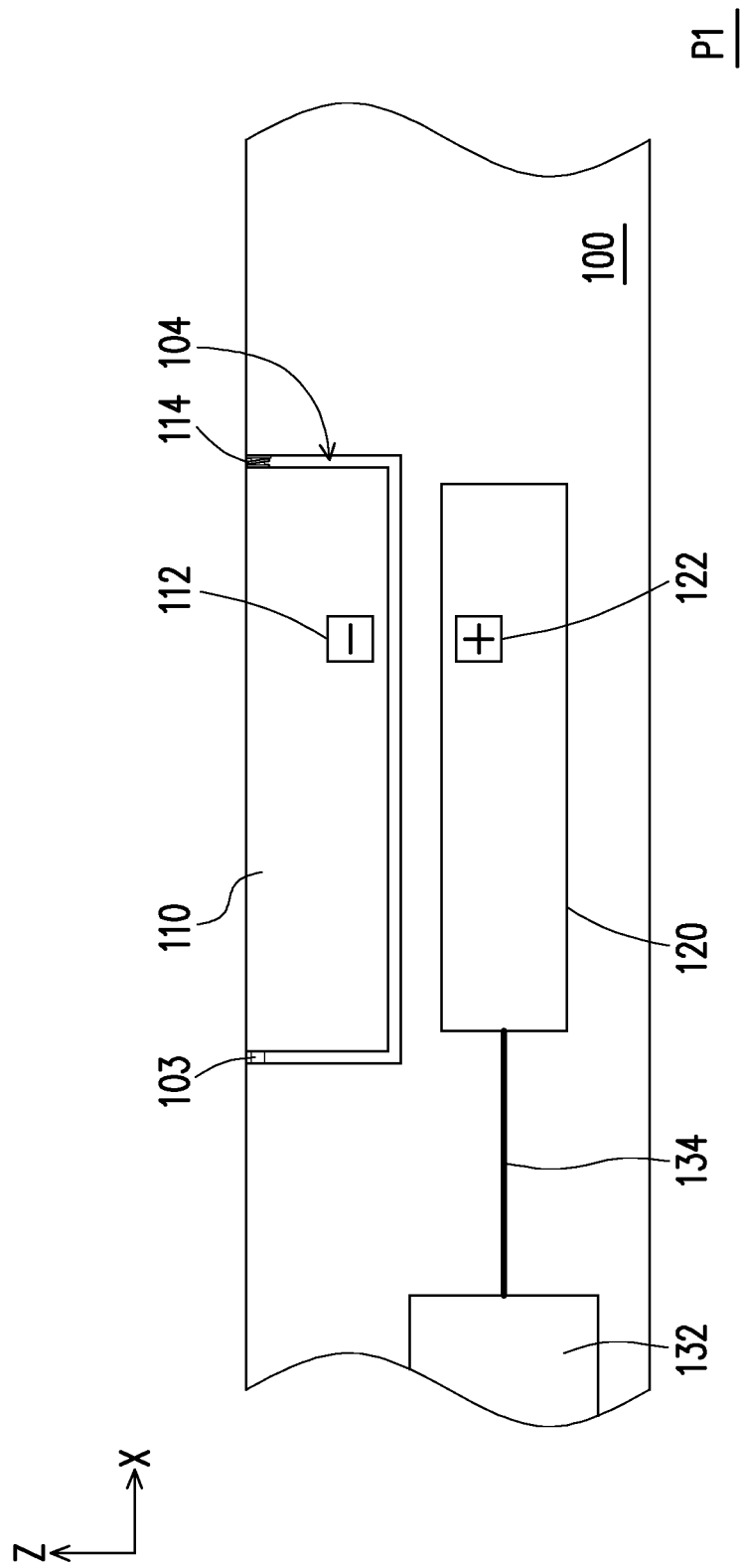
FIG. 5 is a section schematic diagram when the image capturing module of the electronic device of FIG. 1 is not turned up yet.
Figure 6:
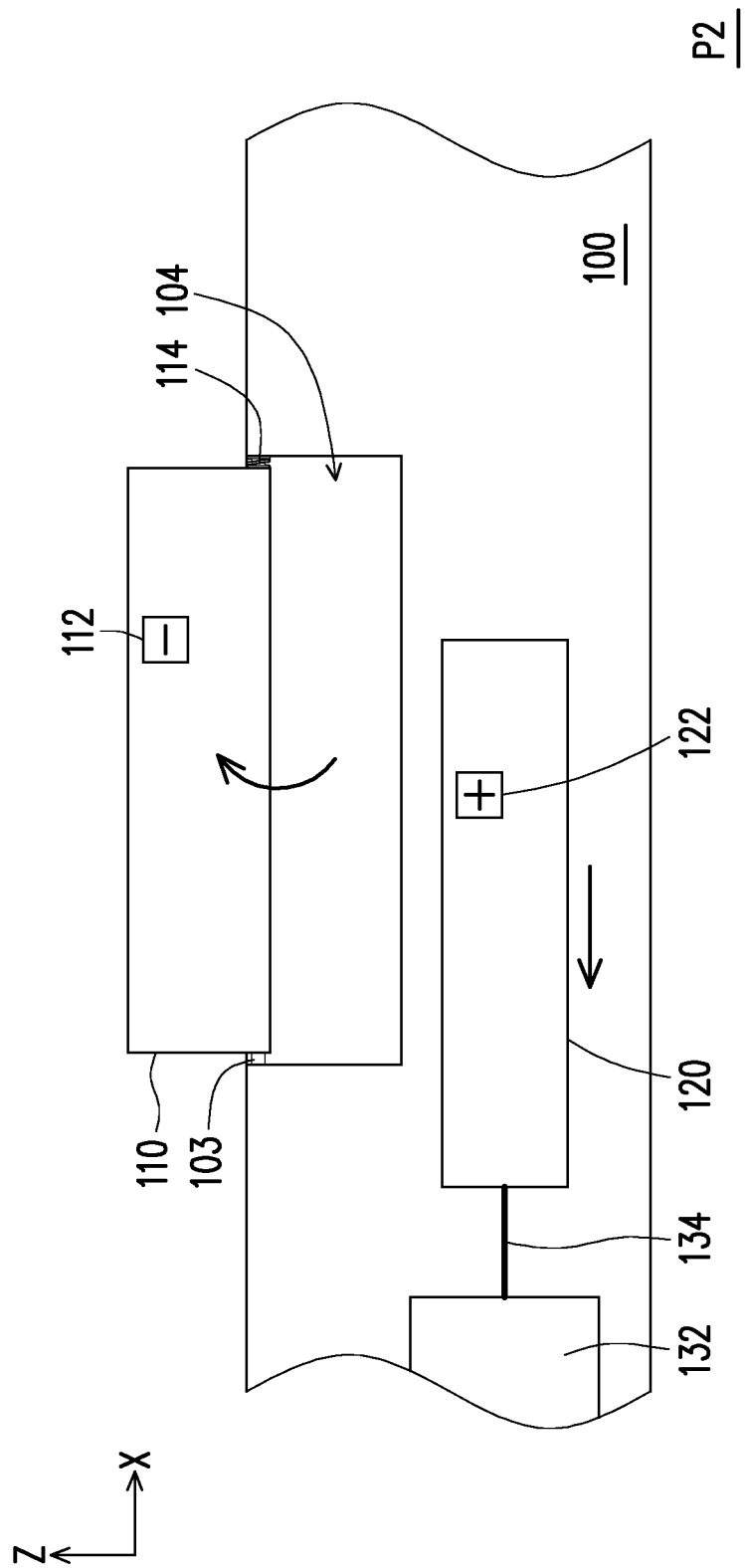
FIG. 6 is a section schematic diagram when the image capturing module of the electronic device of FIG. 1 is turned up.

FIG. 5 is a section schematic diagram when the image capturing module of the electronic device of FIG. 1 is not turned up yet. FIG. 6 is a section schematic diagram when the image capturing module of the electronic device of FIG. 1 is turned up. Referring to FIG. 5 and FIG. 6, FIG. 5 and FIG. 6 are local sectioned views of the first machine body 100 at the image capturing module 110, and a Z direction shown in FIG. 5 and FIG. 6 is a thickness direction of the first machine body 100.

In the embodiment, the first machine body 100 includes a first magnetic member 122 movably disposed therein. The image capturing module 110 includes a second magnetic member 112. The first magnetic member 122 and the second magnetic member 112, for example, are two magnets, and the magnetism of the first magnetic member 122 is opposite to the magnetism of the second magnetic member 112, so that the second magnetic member 112 may be attracted by the first magnetic member 122. Of course, in other embodiments, the first magnetic member 122 and the second magnetic member 112, for example, may be a magnet and a magnetic conductive member capable of being attracted by the magnet respectively.

As shown in FIG. 5, in the embodiment, when the first magnetic member 122 is located at a first position P1, the first magnetic member 122 magnetically attracts the second magnetic member 112 of the image capturing module 110, so that the image capturing module 110 approaches to the first machine body 100 to be located in a cavity 104 of the first machine body 100. When the image capturing module 110 needs to be turned up, as shown in FIG. 6, the first magnetic member 122 may be moved to a second position P2 so as to be staggered from the second magnetic member, at the moment, the second magnetic member 112 of the image capturing module 110 is not magnetically attracted by the first magnetic member 122, and then the image capturing module 110 is not confined to the position of the first machine body 100. In the embodiment, the electronic device 10 includes a rotating shaft 103 and a torsional spring 114 located between the image capturing module 110 and the first machine body 100. One end of the rotating shaft 103 is fixed in the first machine body 100, the other end is fixed in the image capturing module 110, the torsion spring 114 winds the rotating shaft 103, one end of the torsion spring 114 is fixed in the first machine body 100, and the other end is fixed in the image capturing module 110. When the image capturing module 110 is not limited to approach to the position of the first machine body 100, the torsional spring 114 may drive the image capturing module 110, so that the image capturing module 110 is turned up to a position in FIG. 6 relative to the first machine body 100.

In the embodiment, the first machine body 100 further includes a heat source 132 and a memory material member 134. The memory material member 134 is thermally coupled to the heat source 132 and connected to a carrier plate 120, the first magnetic member 122 is disposed on the carrier plate 120, and the memory material member 134 is adapted to be heated by the heat source 132 to deform. In the embodiment, the processor 130 is electrically connected to the heat source 132, and when the trigger switch 102 is triggered, the processor 130 instructs the heat source 132 to emit heat, and the memory material member 134 is heated by the heat source 132 and then is deformed (for example being shortened), so as to drive the first magnetic member 122 to move from the first position P1 (FIG. 5) to the second position P2 (FIG. 6). Of course, a manner of driving the first magnetic member 122 to move from the first position P1 to the second position P2 is not limited to this. The foregoing memory material member is a shape memory alloy member, and specifically, such a shape memory alloy member has a two-way shape memory effect.

In the embodiment, when the first magnetic member 122 moves to the second position P2, the direction of an optical axis 115 (marked in FIG. 3) of the first lens 111 (marked in FIG. 3) and the direction of an optical axis 116 (marked in FIG. 4) of the second lens 113 (marked in FIG. 4) are respectively parallel to a horizontal reference plane, wherein the horizontal reference plane, for example, is a tabletop. In addition, in one embodiment, the first magnetic member 122 may also contain multiple first magnets, the second magnetic member 112 may also contain multiple second magnets, and the quantities of the first magnetic member 122 and the second magnetic member 112 are not limited to this.

Figure 7:
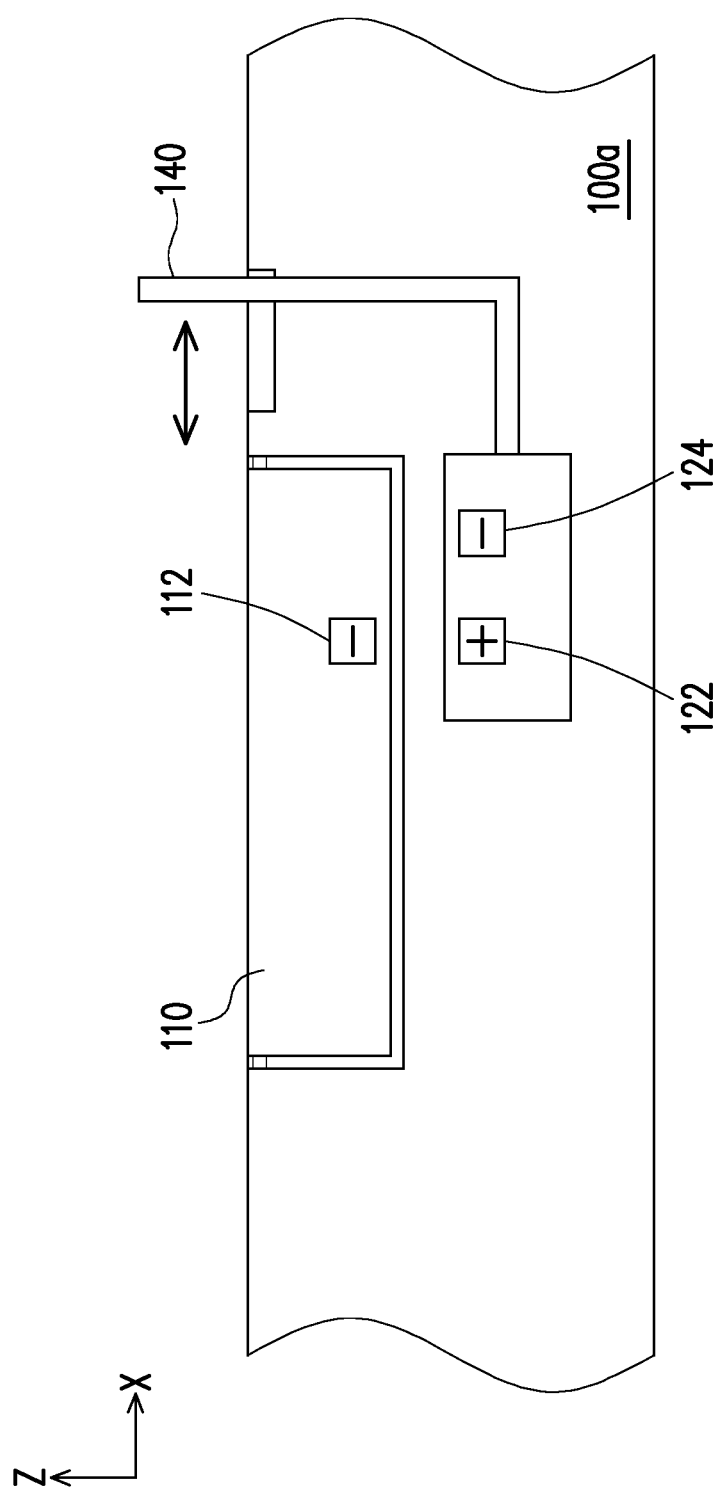
FIG. 7 is a section schematic diagram of an electronic device according to another embodiment of the disclosure.

FIG. 7 is a section schematic diagram of an electronic device according to another embodiment of the disclosure. Referring to FIG. 7, in the embodiment, a first machine body 100a includes a shifting rod 140, which is linked to the first magnetic member 122 and exposed out of the first machine body 100a. When the first magnetic member 122 is at a position as shown in FIG. 7, the first magnetic member 122 magnetically attracts the second magnetic member 112 of the image capturing module 110, so that the image capturing module 110 approaches to the first machine body 100a to be located in a groove of the first machine body 100a. When the shifting rod 140 is moved to the left of FIG. 7, the first magnetic member 122 is linked to the shifting rod 140 to be moved to a position staggered from the second magnetic member 112. At the moment, the second magnetic member 112 of the image capturing module 110 is not magnetically attracted by the first magnetic member 122. In addition, in the embodiment, the first machine body 100a further includes a third magnetic member 124 linked to the shifting rod 140, and the magnetism of the third magnetic member 124, for example, is the same as the magnetism of the second magnetic member 112. Therefore, in the embodiment, when the third magnetic member 124 is aligned to the second magnetic member 112, the second magnetic member 112 bears magnetic repulsive force of the third magnetic member 124 so as to tend to move towards a direction away from the third magnetic member 124 (for example an upward side), and then the image capturing module 110 may be driven to be turned up.

Returning to FIG. 2, in the embodiment, the image capturing module 110 is pivotally connected to a first side 101 of the first machine body 100. The first machine body 100 includes a keyboard module 150, and the keyboard module includes multiple rows of keys 152, 154. In the embodiment, when the image capturing module 110 approaches to the first machine body, the image capturing module 110 is located between the first side 101 and the row of keys 152 which are closest to the first side 101, that is, the image capturing module 110 does not extend into the row of keys 152 closest to the first side 101. Of course, in other embodiments, the electronic device 10 may reduce a distance between the first side and the keyboard module 150, so that when the image capturing module 110 approaches to the first machine body 100, the image capturing module 110 may extend into at least one row of theses rows of keys 152 and 154 closes to the first side 101.

Figure 8:
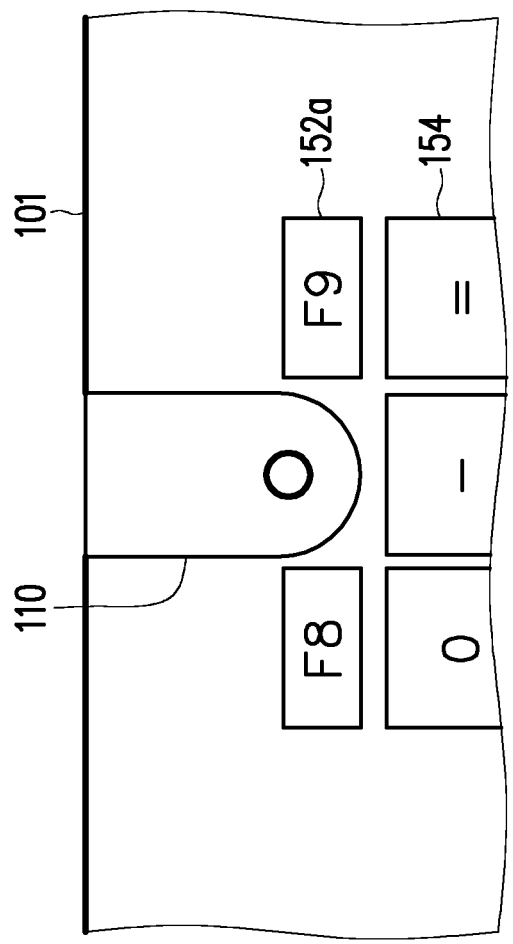
FIG. 8 and FIG. 9 are local schematic diagrams of multiple electronic devices according to other embodiments of the disclosure.
Figure 9:
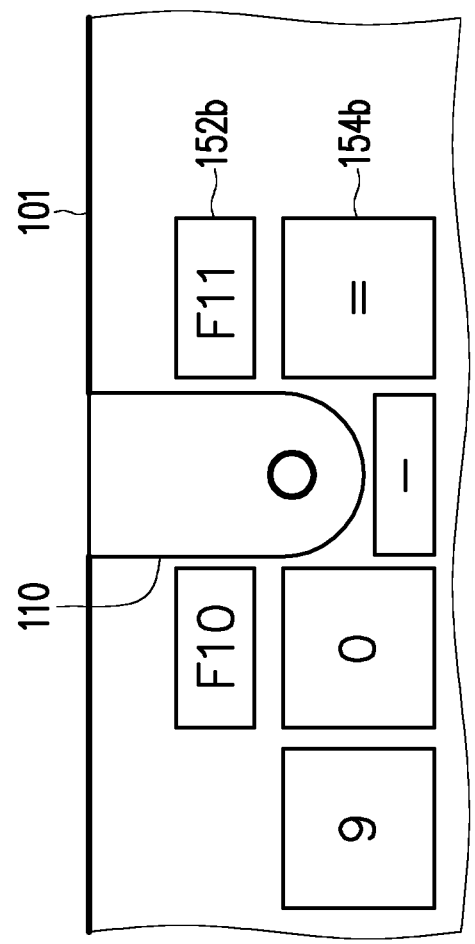

FIG. 8 and FIG. 9 are local schematic diagrams of multiple electronic devices according to other embodiments of the disclosure. Referring to FIG. 8 first, in the embodiment, when the image capturing module 110 approaches to the first machine body, the image capturing module 110 may extend into one row of keys 152a closest to the first side 101. In other words, a design of giving way to the image capturing module 110 may be adopted for keys 152a of FIG. 8, so as to shorten the distance between the first side 101 of the first machine body and the row of keys 152a closest to the first side 101, and to reduce the size of the first machine body.

Or the distance between the first side 101 and the row of keys 152a closest to the first side 101 may be further shortened, and as shown in FIG. 9, when the image capturing module 110 approaches to the first machine body, the image capturing module 110 may extend into two rows of keys 152b and 154b closes to the first side 101. In other words, a design of giving way to the image capturing module 110 may be adopted for keys 152b and 154b of FIG. 9, so as to shorten the distance between the first side 101 of the first machine body and the two row of keys 152b and 154b closest to the first side 101, and to reduce the size of the first machine body.

Figure 10:
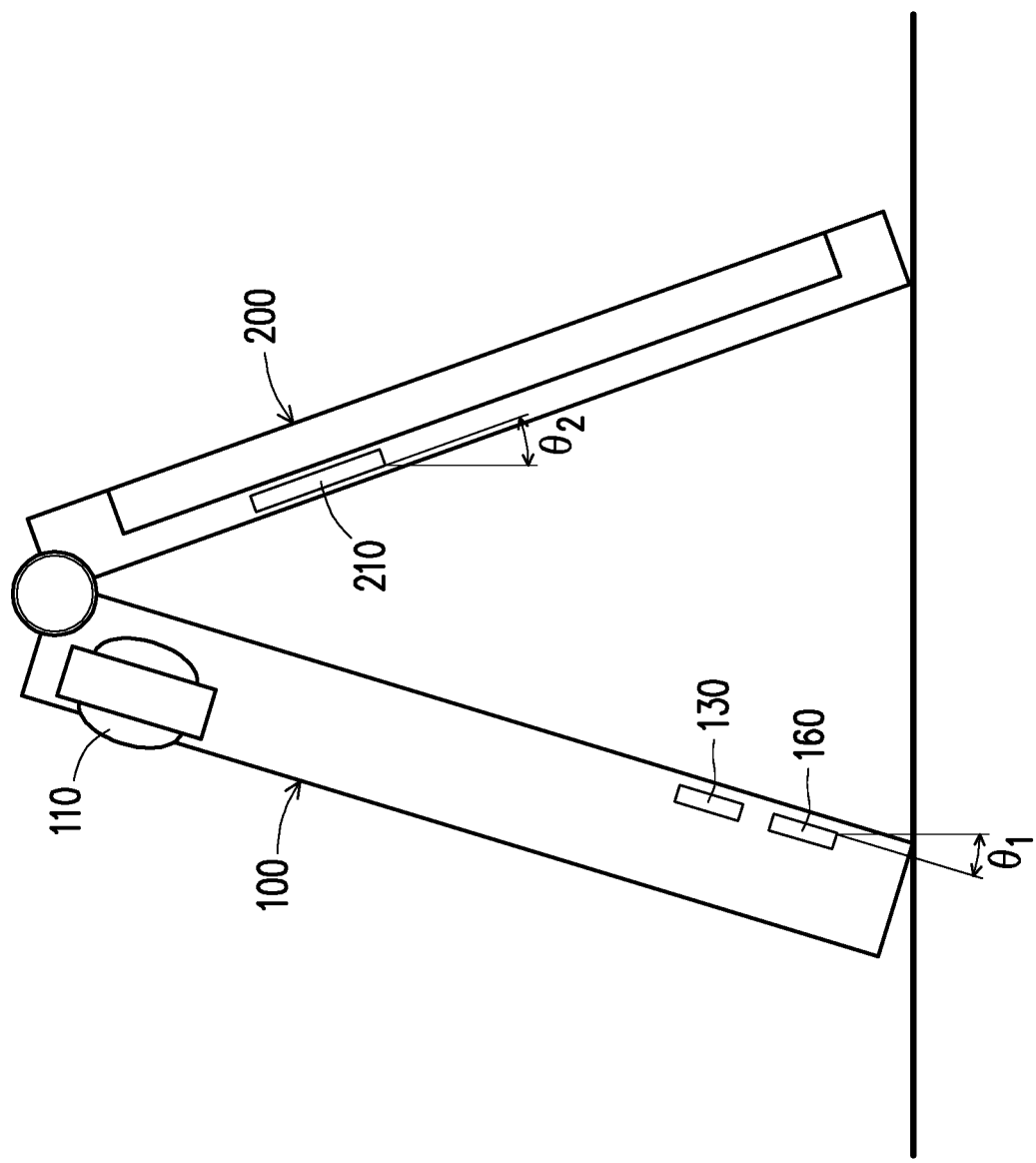
FIG. 10 is a side view schematic diagram of the electronic device of FIG. 1 in the tent position.

FIG. 10 is a side view schematic diagram of the electronic device of FIG. 1 in the tent position. Referring to FIG. 10, in the embodiment, the first machine body 100 further includes a first gravity sensor 160 electrically connected to the processor 130, and the second machine body 200 includes a second gravity sensor 210 electrically connected to the processor 130. The first gravity sensor 160 may sense an included angle between the first machine body 100 and a gravity direction, and the second gravity sensor 210 may sense an included angle between the second machine body and the gravity direction. Therefore, the processor may determine a current posture of the electronic device 10, and a designer may design the electronic device 10 in a manner that only when the electronic device 10 is in a certain specific position (for example a tent position, or a position close to a tent), the image capturing module 110 can be turned up, so as to avoid the condition that the image capturing module 110 turn up to hit the second machine body 200 when the trigger switch 102 is mistakenly touched by a user.

Figure 11:
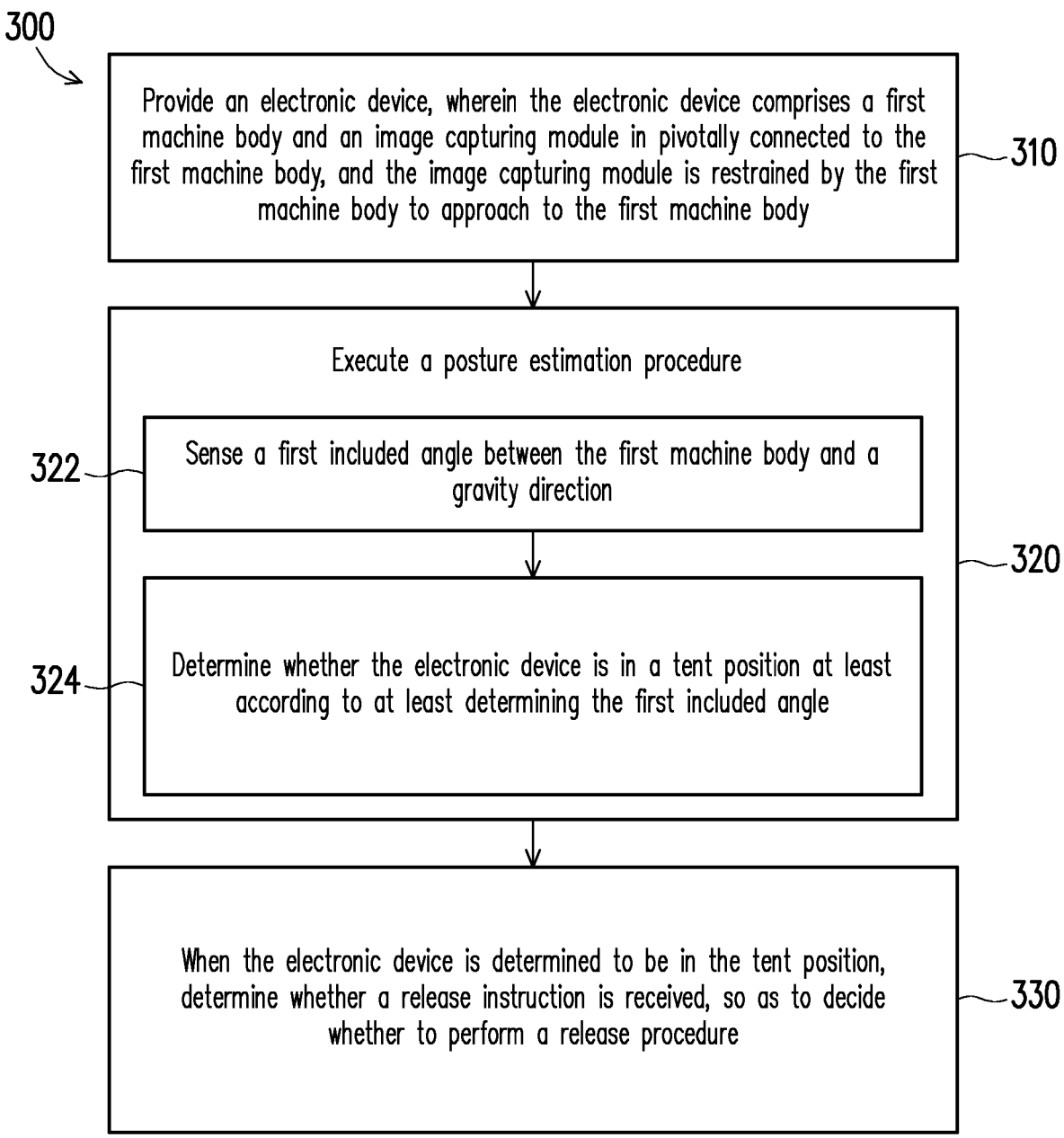
FIG. 11 is a flow diagram of a releasing method of an image capturing module of an electronic device according to an embodiment of the disclosure.

FIG. 11 is a flow diagram of a releasing method of an image capturing module of an electronic device according to an embodiment of the disclosure. Referring to FIG. 10 and FIG. 11, a releasing method 300 of the image capturing module of the electronic device of the embodiment is applied to the electronic device 10 as an example, but the variety of applied devices is not limited to this. The releasing method 300 of the image capturing module of the electronic device of the embodiment includes the following steps.

Firstly, provide an electronic device 10, wherein the electronic device 10 includes a first machine body 100 and an image capturing module 110 pivotally connected to the first machine body, and the image capturing module 110 is restrained by the first machine body 100 to approach to the first machine body 100 (step 310).

Then, execute a posture estimation procedure (step 320). The posture estimation procedure further includes: sensing a first included angle θ1 between the first machine body 100 and a gravity direction (step 322); and determining whether the electronic device 10 is in a tent position at least according to determination of the first included angle θ1 (step 324). In the embodiment, when the first included angle θ1 is within a first preset range, the electronic device 10 is determined to be in the tent position. The first preset range, for example, is between 10 degrees and 60 degrees, but the first preset range is not limited to this.

It is worth mentioning that, if the electronic device 10 further includes a second machine body 200 pivotally connected to the first machine body 100, the posture estimation procedure may selectively further include: sensing a second included angle θ2 between the second machine body 200 and the gravity direction; and determining whether the second included angle θ2 is within a second preset range. Therefore, if the first included angle θ1 is within the first preset range, and the second included angle θ2 is within the second preset range, the electronic device 10 is determined to be in the tent position. In the embodiment, the second preset range, for example, is between 10 degrees and 60 degrees, but the second preset range is not limited to this.

Finally, when the electronic device 10 is determined to be in the tent position, determine whether a release instruction is received, so as to decide whether to perform a release procedure, wherein when the release instruction is received, the first machine body 100 releases the image capturing module 110, so that the image capturing module 110 is turned up relative to the first machine body 100 (step 330). In the embodiment, a manner of receiving the release instruction, for example, is that the trigger switch 102 senses the touch of the user, at the moment, the processor 130 may instruct the heat source 132 to heat the memory material member 134, and after the memory material member 134 is heated by the heat source 132 to deform, the first magnetic member 122 is linked to the memory material member 134 to keep away from the second magnetic member 112, so as to release the image capturing module. Of course, a manner of receiving the release instruction is not limited to this. In one embodiment, after the release procedure is performed, the temperature of the memory material member 134 is cooled, and the memory material member restores to its original shape, so as to cause the first magnetic member 122 to return to the original position. Then, when the user returns the image capturing module 110 into the cavity 104 of the first machine body 100, the first magnetic member 122 may attract the second magnetic member of the image capturing module 110, so that the image capturing module 110 stays in the cavity 104.

Figure 12:
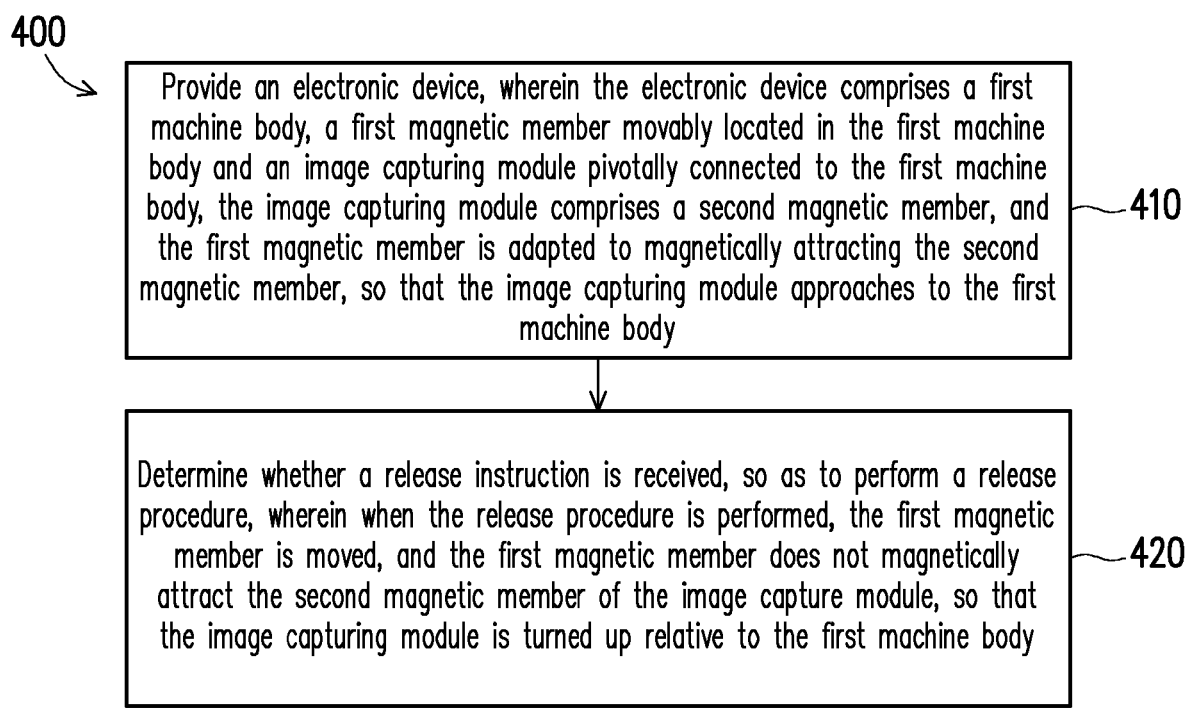
FIG. 12 is a flow diagram of a releasing method of an image capturing module of an electronic device according to another embodiment of the disclosure.

Of course, the electronic device 10 may also turn up the image capturing module 110 after receiving the release instruction instead of determining the posture. FIG. 12 is a flow diagram of a releasing method of an image capturing module of an electronic device according to another embodiment of the disclosure. Referring to FIG. 5-FIG. 7 and FIG. 12, a releasing method 400 of an image capturing module of an electronic device of the embodiment includes the following steps.

Firstly, provide an electronic device 10, wherein the electronic device 10 includes a first machine body 100, a first magnetic member 122 movably located in the first machine body 100 and an image capturing module 110 pivotally connected to the first machine body 100, the image capturing module 110 includes a second magnetic member 112, and the first magnetic member 122 is adapted for magnetically attracting the second magnetic member 112, so that the image capturing module 110 approaches to the first machine body 100 (step 410).

Then, determine whether a release instruction is received, so as to perform a release procedure, wherein when the release procedure is performed, the first magnetic member 122 is moved, and the first magnetic member 122 does not magnetically attract the second magnetic member 112 of the image capturing module 110, so that the image capturing module 110 is adapted to be turned up relative to the first machine body 100 (step 420).

In embodiments, for example, of FIG. 5 and FIG. 6, when the release procedure is performed, the memory material member 134 is heated by the heat source 132 to deform, and the first magnetic member 122 is linked to the memory material member 134 to keep away from the second magnetic member 112, so that the image capturing module 110 may be turned up relative to the first machine body.

In the embodiment, for example, of FIG. 7, the release instruction, for example, is that the user manually moves the shifting rod 140, and when the user moves the shifting rod 140, the release procedure is performed, and then the first magnetic member 122 may move along with the shifting rod 140 to keep away from the second magnetic member 112, so that the image capturing module 110 may be turned up relative to the first machine body.

It is worth mentioning that, in one embodiment, the release instruction is a touch control instruction or a button instruction. In one embodiment, the first machine body 100 includes a control switch, which is configured to activate the image capturing module 110. After the release procedure is performed, the control switch is triggered, for example, triggered by being touched by the turned-up image capturing module 110, or triggered by receiving an instruction of the processor 130, and the image capturing module 110 is correspondingly activated to come into operation. In one embodiment, the first machine body 100 includes an indicator light, and when the release procedure is performed, the indicator light shines or flickers for a preset time. In one embodiment, after the release procedure is performed, the control switch is triggered (for example, triggered by being touched by the turned-up image capturing module 110, or triggered by receiving an instruction of the processor 130) to turn off the indicator light. In one embodiment, when the release procedure is performed, a display module displays a prompt screen of the image capturing module 110 or a user operation interface of the image capturing module 110.

Based on the foregoing, in a releasing method of an image capturing module of an electric device of an embodiment of the disclosure, whether the electronic device is in a tent position may be determined by a posture estimation procedure, and when the electronic device is determined to be in the tent position and receives a release instruction, a first machine body releases the image capturing module, so that the image capturing module is turned up relative to the first machine body. In a releasing method of an image capturing module of an electric device of an embodiment of the disclosure, a first machine body may directly release the image capturing module by directly determining whether a release instruction is received. In an electronic device of the disclosure, when a first magnetic member of the first machine body is located at a first position, the first magnetic member magnetically attracts a second magnetic member of the image capturing module, so that the image capturing module approaches to the first machine body. When the first magnetic member moves to a second position, the first magnetic member does not magnetically attract the second magnetic member of the image capturing module, so that the image capturing module is turned up relative to the first machine body.

Although the disclosure has been disclosed as above through the embodiments, the embodiments are not intended to limit the disclosure, any person ordinarily skilled in the art can make some alternation and modification without deviating from the spirit and scope of the disclosure, and therefore, the protection scope of the disclosure should be subject to the definition of the appended claims

What is claimed is:

1. A releasing method of an image capturing module of an electronic device, comprising:
   providing an electronic device, the electronic device comprising a first machine body and an image capturing module pivotally connected to the first machine body, and the image capturing module being restrained by the first machine body so as to approach the first machine body;
   executing a posture estimation procedure, wherein the posture estimation procedure comprises sensing a first included angle between the first machine body and a gravity direction for determining whether the electronic device is in a tent position, determining whether the electronic device receives a release instruction when the electronic device is determined to be in the tent position, so as to decide whether to perform a release procedure,
   wherein the image capturing module is released when the release procedure is performed, so that the image capturing module is turned up relative to the first machine body,
   wherein the first machine body comprises a first magnetic member movably disposed therein, the image capturing module comprises a second magnetic member, the first magnetic member is adapted for magnetically attracting the second magnetic member, so that the image capturing module approaches to the first machine body, and when the release procedure is performed, the first magnetic member is moved, so that the first magnetic member does not magnetically attract the second magnetic member of the image capturing module.

2. The releasing method of an image capturing module of an electronic device according to claim 1, wherein when the first included angle is within a first preset range, it is determined that the electronic device is in the tent position.

3. The releasing method of an image capturing module of an electronic device according to claim 2, wherein the first preset range is between 10 degrees and 60 degrees.

4. The releasing method of an image capturing module of an electronic device according to claim 2, wherein the electronic device further comprises a second machine body pivotally connected to the first machine body, and the posture estimation procedure further comprises sensing a second included angle between the second machine body and the gravity direction for determining whether the second included angle is within a second preset range, wherein when the first included angle is within the first preset range and the second included angle is within the second preset range, it is determined that the electronic device is in the tent position.

5. The releasing method of an image capturing module of an electronic device according to claim 4, wherein the second preset range is between 10 degrees and 60 degrees.

6. The releasing method of an image capturing module of an electronic device according to claim 1, wherein the first machine body further comprises a heat source and a memory material member, the memory material member is thermally coupled to the heat source and connected to the first magnetic member, and when the release procedure is performed, the memory material member is heated by the heat source to deform, and the first magnetic member is linked to the memory material member so as to keep away from the second magnetic member.

7. The releasing method of an image capturing module of an electronic device according to claim 6, wherein after the release procedure is performed, the temperature of the memory material member is cooled, and the memory material member restores to its original shape, so as to cause the first magnetic member to return to the original position.

8. The releasing method of an image capturing module of an electronic device according to claim 4, wherein when the electronic device is in the tent position, a first turn-up angle is formed between the image capturing module and the first machine body, a second turn-up angle is formed between the first machine body and the second machine body, and the second turn-up angle is equal to two times of the first turn-up angle.

9. A releasing method of an image capturing module of an electronic device, comprising:
   providing an electronic device, wherein the electronic device comprises a first machine body, a first magnetic member movably located in the first machine body and an image capturing module pivotally connected to the first machine body, the image capturing module comprises a second magnetic member, and the first magnetic member is adapted for magnetically attracting the second magnetic member, so that the image capturing module approaches to the first machine body; and determining whether the electronic device receives a release instruction, so as to perform a release procedure, wherein when the release procedure is performed, the first magnetic member is moved, and the first magnetic member does not magnetically attract the second magnetic member of the image capturing module, so that the image capturing module is adapted to be turned up relative to the first machine body.

10. The releasing method of an image capturing module of an electronic device according to claim 9, wherein the release instruction is a touch control instruction or a button instruction.

11. The releasing method of an image capturing module of an electronic device according to claim 9, wherein the first machine body comprises an indicator light, and when the release procedure is performed, the indicator light shines or flickers for a preset time.

12. The releasing method of an image capturing module of an electronic device according to claim 11, wherein the first machine body comprises a control switch, and after the release procedure is performed, the image capturing module triggers the control switch, so as to activate the image capturing module.

13. The releasing method of an image capturing module of an electronic device according to claim 12, wherein after the release procedure is performed, the image capturing module triggers the control switch, so as to turn off the indicator light.

14. The releasing method of an image capturing module of an electronic device according to claim 9, wherein the electronic device further comprises a second machine body, being pivotally connected to the first machine body, and the second machine body comprises a display module.

15. The releasing method of an image capturing module of an electronic device according to claim 14, wherein when the release procedure is performed, the display module displaying a prompt screen of the image capturing module or a user operation interface of the image capturing module.

16. An electronic device, comprising:
a first machine body, comprising a first magnetic member movably disposed therein; and
an image capturing module, being pivotally connected to the first machine body and comprising a second magnetic member,
wherein when the first magnetic member is located at a first position, the first magnetic member magnetically attracts the second magnetic member of the image capturing module, so that the image capturing module approaches to the first machine body, and
wherein when the first magnetic member moves to a second position, the first magnetic member does not attract the second magnetic member of the image capturing module, so that the image capturing module is adapted to be turned up relative to the first machine body.

17. The electronic device according to claim 16, wherein the first machine body further comprises:
a heat source; and
a memory material member, being thermally coupled to the heat source and connected with the first magnetic member, the memory material member is adapted to be heated by the heat source to deform, and the first magnetic member being linked to the memory material member so as to move from the first position to the second position.

18. The electronic device according to claim 17, wherein the first machine body further comprises:
a processor, being electrically connected to the heat source; and
a trigger switch, being electrically connected to the processor, and when the trigger switch is triggered, the processor instruct the heat source to emit heat.

19. The electronic device according to claim 18, wherein the first machine body still further comprises:
a first gravity sensor, being electrically connected to the processor.

20. The electronic device according to claim 18, further comprising:
a second machine body, being pivotally connected to the first machine body.

21. The electronic device according to claim 20, wherein the second machine body comprises a second gravity sensor, being electrically connected to the processor.

22. The electronic device according to claim 16, wherein the first machine body further comprises:
a shifting rod, being linked to the first magnetic member and exposed out of the first machine body, and when the shifting rod is moved, the first magnetic member being linked to the shifting rod so as to move from the first position to the second position.

23. The electronic device according to claim 16, wherein the first machine body comprises a keyboard module, the image capturing module is pivotally connected to a first side of the first machine body, the keyboard module comprises multiple rows of keys, and when the image capturing module approaches to the first machine body, the image capturing module is located between the first side and one row of keys which are closest to the first side.

24. The electronic device according to claim 16, wherein the first machine body comprises a keyboard module, the image capturing module is pivotally connected to a first side of the first machine body, the keyboard module comprises multiple rows of keys, and when the image capturing module approaches to the first machine body, the image capturing module extends into at least one row of some rows of keys closest to the first side.

25. The electronic device according to claim 16, wherein the first machine body further comprises a cavity, being configured to contain the image capturing module.

26. The electronic device according to claim 16, wherein the image capturing module comprises a first lens and a second lens.

27. The electronic device according to claim 26, wherein when the first magnetic member moves to the second position, an optical axis direction of the first lens and an optical axis direction of the second lens are respectively parallel to a horizontal reference plane.

28. The electronic device according to claim 16, wherein the first machine body further comprises a torsional spring and a rotating shaft, and wherein one end of the rotating shaft is fixed in the first machine body, the other end is fixed in the image capturing module, the torsional spring winds the rotating shaft, one end of the torsional spring is fixed in the first machine body, the other end is fixed in the image capturing module, and when the first magnetic member moves to the second position, the image capturing module turns up relative to the first machine body due to the action of the torsional spring.

29. The electronic device according to claim 16, wherein the first magnetic member contains multiple first magnets, and the second magnetic member contains multiple second magnets.

30. The electronic device according to claim 16, wherein when the first magnetic member moves to the second position, the first magnets and the second magnets repel each other, and the image capturing module turns up relative to the first machine body due to the effect of repelling.

31. A releasing method of an image capturing module of an electronic device, comprising:

providing an electronic device, the electronic device comprising a first machine body and an image capturing module pivotally connected to the first machine body, and the image capturing module being restrained by the first machine body so as to approach the first machine body;

executing a posture estimation procedure, wherein the posture estimation procedure comprises sensing a first included angle between the first machine body and a gravity direction for determining whether the electronic device is in a tent position, determining whether the electronic device receives a release instruction when the electronic device is determined to be in the tent position, so as to decide whether to perform a release procedure, wherein the image capturing module is released when the release procedure is performed, so that the image capturing module is turned up relative to the first machine body, wherein the electronic device further comprises a second machine body pivotally connected to the first machine body, and the posture estimation procedure further comprises sensing a second included angle between the second machine body and the gravity direction for determining whether the second included angle is within a second preset range, wherein when the first included angle is within the first preset range and the second included angle is within the second preset range, it is determined that the electronic device is in the tent position, wherein when the electronic device is in the tent position, a first turn-up angle is formed between the image capturing module and the first machine body, a second turn-up angle is formed between the first machine body and the second machine body, and the second turn-up angle is equal to two times of the first turn-up angle.

* * * * *